United States Patent
Mori

(10) Patent No.: US 8,259,267 B2
(45) Date of Patent: Sep. 4, 2012

(54) DISPLAY APPARATUS AND MANUFACTURING METHOD THEREOF

(75) Inventor: Makoto Mori, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 191 days.

(21) Appl. No.: 12/872,406

(22) Filed: Aug. 31, 2010

(65) Prior Publication Data

US 2011/0051063 A1    Mar. 3, 2011

(30) Foreign Application Priority Data

Aug. 31, 2009    (JP) ................. 2009-200083

(51) Int. Cl.
  *G02F 1/1333*    (2006.01)
  *B29C 65/54*    (2006.01)

(52) U.S. Cl. .................. 349/122; 349/187; 156/295

(58) Field of Classification Search ............. 349/122, 349/153, 154, 187, 188, 189; 156/295
See application file for complete search history.

(56) References Cited

U.S. PATENT DOCUMENTS

| | | | |
|---|---|---|---|
| 7,164,455 B2 * | 1/2007 | Takagi et al. | 349/114 |
| 7,948,600 B2 * | 5/2011 | Okamoto et al. | 349/187 |
| 8,115,882 B2 * | 2/2012 | Nakao | 349/40 |
| 2011/0051063 A1 * | 3/2011 | Mori | 349/122 |

FOREIGN PATENT DOCUMENTS

| | | |
|---|---|---|
| JP | 07-036623 | 2/1995 |
| JP | 09-274536 | 10/1997 |
| JP | 10-240441 | 9/1998 |
| JP | 2001-133795 | 5/2001 |
| JP | 2001-356323 | 12/2001 |
| JP | 2002-006325 | 1/2002 |
| JP | 2002-259052 | 9/2002 |
| JP | 2004-184540 | 7/2004 |
| JP | 2007-034736 | 2/2007 |

* cited by examiner

*Primary Examiner* — Brian Healy
(74) *Attorney, Agent, or Firm* — Young & Thompson

(57) ABSTRACT

A manufacturing method of the present invention is a manufacturing method of a display device with a functional film that is adhered to a principal plane of a display panel provided with a display part. A first resin layer is formed outside the display part on the principal plane to surround the display part, a communication part which allows an inner area surrounded by the first resin layer and an outer area outside of the first resin layer to communicate with each other in an in-plane direction of the principal plane is formed, the inner area is coated with a second resin, the functional film is superimposed on the principal plane, and the second resin is pressed and spread throughout the inner area and the communication part by pressing the functional film.

10 Claims, 5 Drawing Sheets

DISPLAY APPARATUS AND MANUFACTURING METHOD THEREOF

This application is based upon and claims the benefit of priority from Japanese patent application No. 2009-200083, filed on Aug. 31, 2009, the disclosure of which is incorporated herein in its entirety by reference.

BACKGROUND OF THE INVENTION

1. Field of the Invention

The present invention relates to a display device, and, in particular, relates to a display device having a display surface with a functional film attached thereon.

2. Description of the Related Art

There is known a display device which has a liquid crystal panel with a functional film such as a touch panel that is adhered to a display surface. For example, JP2001-356323A (Document 1) describes a liquid crystal display device which has a liquid crystal panel to which a touch panel is adhered. In the liquid crystal display device, the liquid crystal panel and the touch panel adhered to each other by a pressure sensitive adhesive double coated tape or a seal material. The pressure sensitive adhesive double coated tape or the seal material is disposed so as to surround the display area of the liquid crystal panel.

JP2002-259052A (Document 2) describes a liquid crystal display device which has a liquid crystal display and a touch panel which adhered to each other via a seal material having a predetermined thickness. Further, in the liquid crystal display device described in document 2, a transparent gas is sealed between the liquid crystal display and the touch panel. In the liquid crystal display device described in JP2002-259052, deflection of the touch panel is suppressed by the gas sealed between the liquid crystal display and the touch panel, and contact of the liquid crystal display and the touch panel is avoided.

JP2007-34736A (Document 3) describes a display device which has a display and a touch panel which are overlaid on each other via a plurality of glass beads. In the display device described in JP2007-34736A, distortion of the touch panel is reduced by the glass beads, and contact of the display and the touch panel is avoided.

JP09-274536A (Document 4) describes a manufacturing method of a display device which has the step of bonding a liquid crystal display element and a transparent touch switch to each other by a transparent adhesive. The manufacturing method has the step of applying a transparent adhesive to the center of the back surface of the transparent touch switch, the step of inverting the transparent touch switch, the step of slowly superimposing the back surface of the transparent touch switch coated with the transparent adhesive and the front surface of the liquid crystal display element, and the step of causing the transparent adhesive to flow between the back surface of the transparent touch switch and the surface of the liquid crystal display element.

An air layer is present between the liquid crystal panel and the touch panel of the liquid crystal display device described in document 1. Accordingly, the contrast is reduced by scattering and reflection of light by the air layer. Further, the touch panel is supported at only its peripheral edge portion, and therefore, if pressure is applied to the touch panel, the panel bends to be in contact with the liquid crystal panel, and unevenness in the display occurs.

In each of the display devices described in document 2 and document 3, the entire surface or the substantially entire surface of the touch panel is supported by the gas or glass beads, and therefore, deflection of the touch panel is suppressed. Therefore, one of the above described disadvantages that was pointed out concerning the liquid crystal display device described in document 1 is eliminated. However, the display devices are similar to the liquid crystal display device described in document 1 in the respect that the air layer is interposed between the liquid crystal display and the touch panel or between the display and the touch panel. Therefore, the disadvantage of reduction in contrast by scattering and reflection of light due to the air layer is not eliminated.

A transparent adhesive is charged in between the liquid crystal display element and the transparent touch switch of the display device manufactured by the manufacturing method described in document 4. In other words, an air layer is not present between the liquid crystal display element and the transparent touch switch. Accordingly, reduction in contrast due to scattering and reflection of light by the air layer does not occur. However, the manufacturing method described in document 4 has the step of superimposing the back surface of the transparent touch switch coated with the transparent adhesive on the front surface of the liquid crystal display element, and the step of causing the transparent adhesive to flow between the back surface of the transparent touch switch and the front surface of the liquid crystal display element. Accordingly, the transparent adhesive spreads from the centers of the transparent touch switch and the liquid crystal element toward the end portions. In this case, the thickness of the transparent adhesive in the center becomes larger than that in the end portion, and an adverse effect is likely to occur in the display quality. Further, the transparent adhesive which spreads toward the end portions of the transparent touch switch and the liquid crystal display element are likely to flow outside and adhere to the front surface of the transparent touch switch or the back surface of the liquid crystal display element.

SUMMARY

A manufacturing method of the present invention is a manufacturing method of a display device with a functional film stuck to a principal plane of a display panel provided with a display part, and includes forming a first resin layer outside the display part on the principal plane to surround the display part, forming a communication part which causes an inner area surrounded by the first resin layer and an outer area outside of the first resin layer to communicate with each other in an in-plane direction of the principal plane, coating the inner area with a second resin, superimposing the functional film on the principal plane, and pressing and spreading the second resin into the whole of the inner area and the communication part by pressing the functional film against the principal plane.

A display device of the present invention is a display device with a functional film that is adhered to a principal plane of a display panel provided with a display part, and that has a first resin layer formed on the aforesaid principal plane to surround the aforesaid display part, the aforesaid functional film superimposed on the aforesaid principal plane through the aforesaid first resin layer, a communication part which allows an inner area surrounded by the aforesaid first resin layer and an outer area outside of the aforesaid first resin layer to communicate with each other in an in-plane direction of the aforesaid principal plane, and a second resin layer formed in the whole of the aforesaid inner area and the aforesaid communication part.

At least one of the above problems is solved by the present invention.

BRIEF DESCRIPTION OF THE DRAWINGS

The above feature and advantages of the present invention will be more apparent from the following description of certain preferred embodiments taken in conjunction with the accompanying drawings, in which.

DESCRIPTION OF THE EXEMPLARY EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purpose.

First Exemplary Embodiment

Hereinafter, a first exemplary embodiment of a manufacturing method of a display device of the present invention, and a first exemplary embodiment of the display device of the present invention will also be disclosed.

Figure 1:
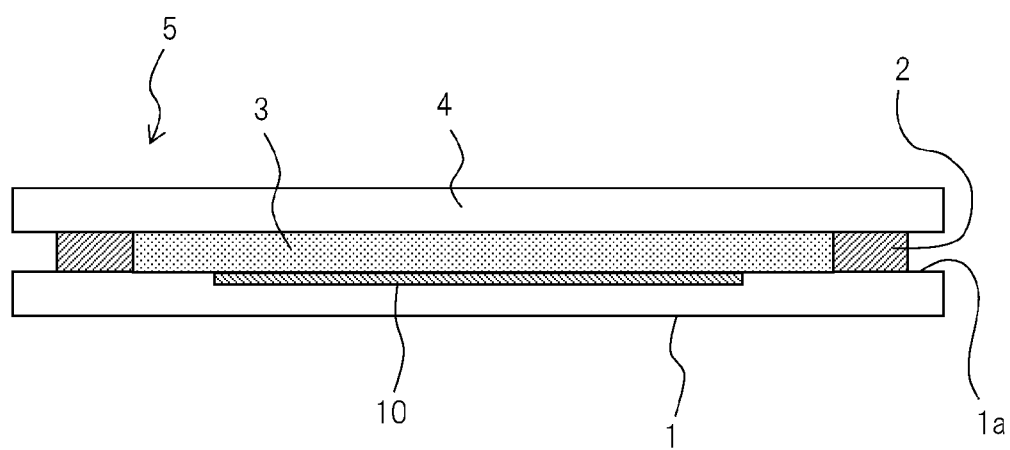
FIG. 1 is a schematic sectional view showing a first exemplary embodiment of a display device of the present invention.

The manufacturing method of the display device of the present invention is a method for manufacturing a display device which has a display panel with a functional film stuck thereon. Specifically, the manufacturing method is a method for manufacturing display device 5 shown in FIG. 1. Display device 5 shown in FIG. 1 has display panel 1, and functional film 4 which is adhered to principal plane 1a of display panel 1 via first resin layer 2 and second resin layer 3. The feature of the manufacturing method according to the present exemplary embodiment is the way of causing display panel 1 and functional film 4 to adhered to each other. Therefore, in this case, the case in which display panel 1 is a liquid crystal panel and functional film 4 is a touch panel is described as an example, but display panel 1 and functional film 4 are not limited to a specific panel or film.

Figure 2A:
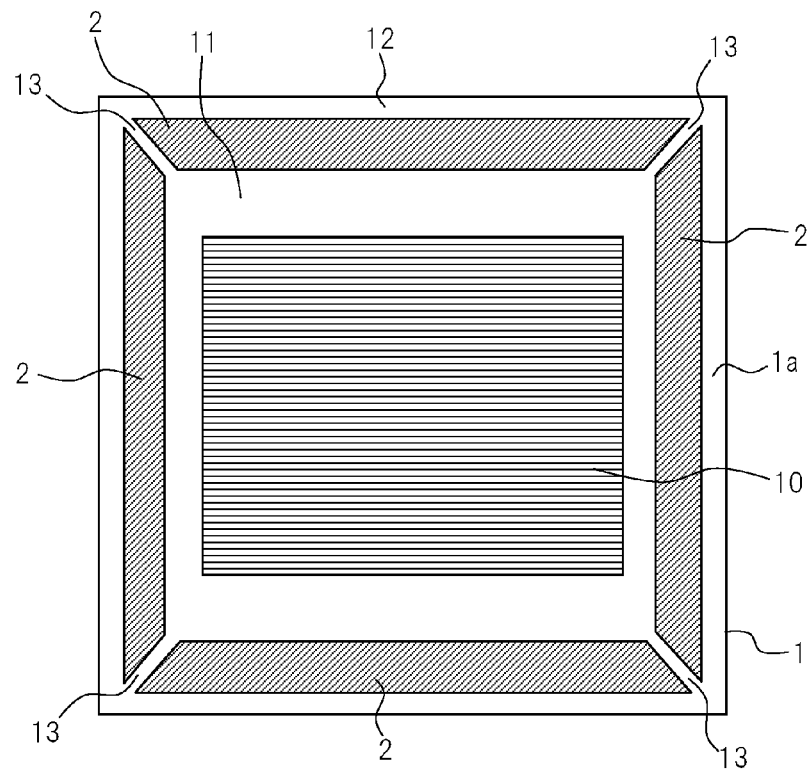
FIGS. 2A to 2D are schematic plane views showing a first exemplary embodiment of a manufacturing method of the display device of the present invention.

First, liquid crystal panel 1 which is provided with display part 10 on principal plane 1a is prepared. Next, as shown in FIG. 2A, first resin layer 2 is formed by applying a first resin (transparent adhesive) on four regions which are on principal plane 1a and which are outside of display part 10. Specifically, four first resin layers 2 are formed along the respective sides of display part 10 at outside of rectangular display part 10. At this time, communication part 13 is formed between adjacent first resin layers 2. As a result, inner area 11 which is surrounded by first resin layers 2 and outer area 12 which is outside of first resin layer 2 communicate with each other in an in-plane direction of principal plane 1a through communication part 13. In other words, inner area 11 which is provided with display part 10 is caused to communicate with outer area 12 through communication part 13.

In the present exemplary embodiment, four first resin layers 2 are disposed so as to surround display part 10. In other words, four first resin layers 2 are disposed in a frame shape. Further, a gap (communication part 13) is formed between short sides, which are adjacent to each other, of two first resin layers 2. As a result, in the present exemplary embodiment, four communication parts 13 are provided. Communication parts 13 may be formed simultaneously with first resin layers 2, or may be formed after first resin layers 2 are formed. More specifically, in the present exemplary embodiment, a plurality of first resin layers 2 is formed by applying the first resin to the four regions which are at the outside of display part 10. Therefore, first resin layer 2 and communication part 13 are simultaneously formed. However, communication parts 13 can be formed afterwards in the following manner, for example. First, single first resin layer 2 is formed by continuously applying the first resin. Thereafter, part of first resin layer 2 is removed.

The next step of the manufacturing method will be described. First resin layer 2 formed as described above is half-cured according to a predetermined method. Specifically, when the first resin is a light-curing resin such as an ultraviolet curable resin, first resin layer 2 is half-cured by irradiating a light beam of a predetermined wavelength. Further, when the first resin is a thermosetting resin, first resin layer 2 is half-cured by heating the resin to a predetermined temperature. Further, when the first resin is an anaerobically curable resin, first resin layer 2 is half-cured by being shut off from air. First resin layer 2 can be formed by a double-sided adhesive tape which has an adhesive resin layer previously provided on both surfaces of a base material. In this case, first resin layer 2 can be formed by having the double-sided adhesive tape adhere to the periphery of display part 10. Further, when first resin layer 2 is formed by a double-sided adhesive tape, the above described step of half-curing first resin layer 2 is not required.

Figure 2B:
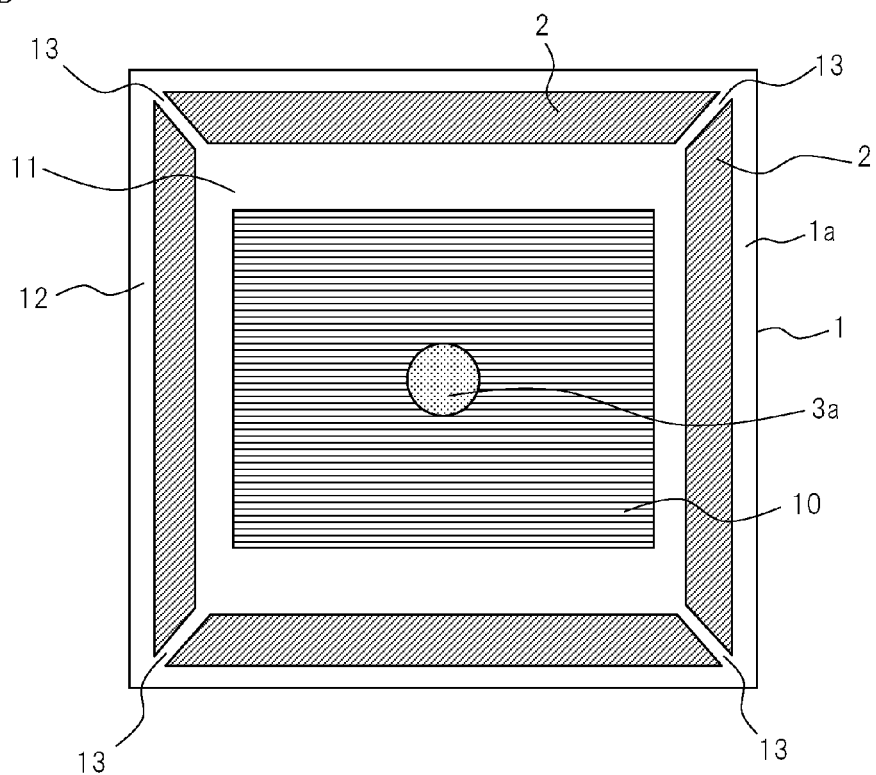

Next, as shown in FIG. 2B, second resin (transparent adhesive) 3a for forming second resin layer 3 (FIG. 1) is applied to the center of inner area 11 which is surrounded by first resin layers 2. In other words, second resin 3a is applied to the position equidistant from four communication parts 13.

Figure 2C:
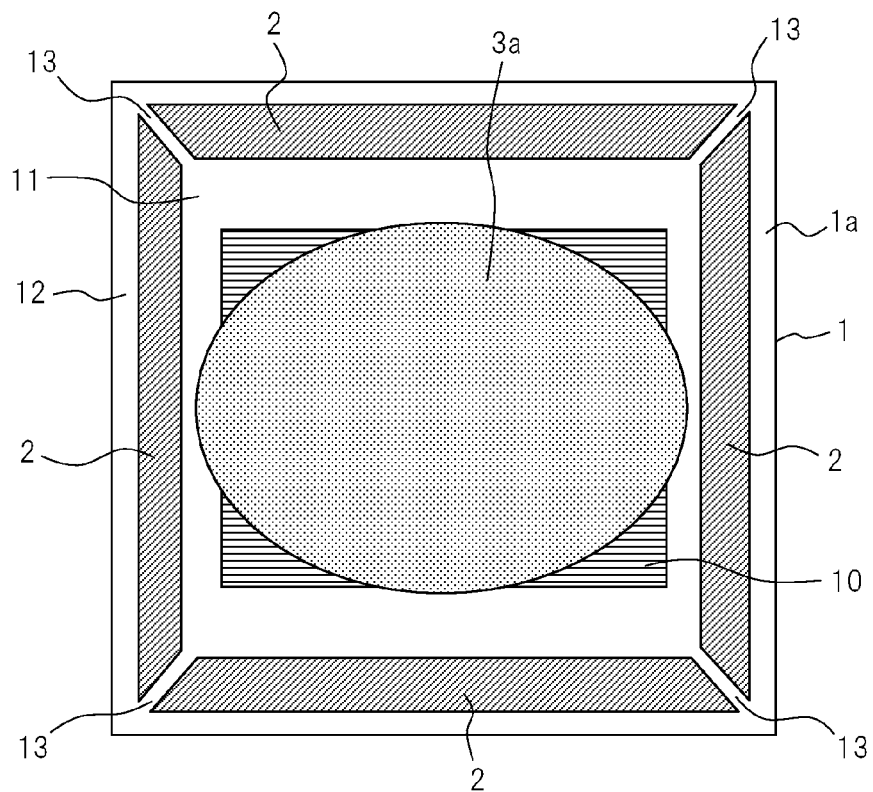
Figure 2D:
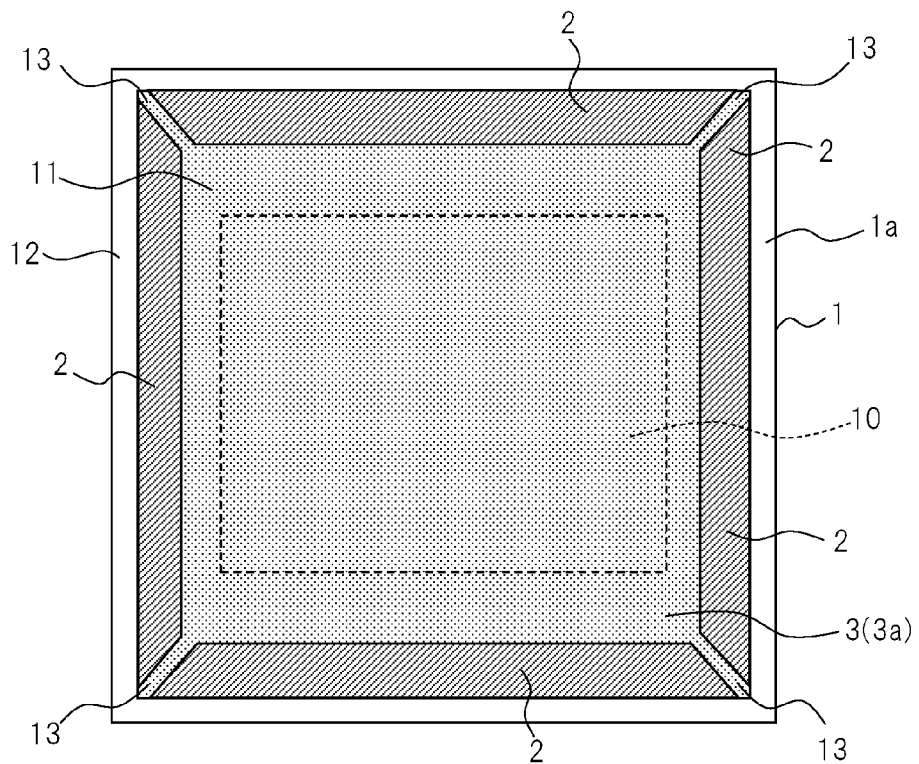

Next, touch panel 4 (FIG. 1) is superimposed on principal plane 1a of liquid crystal panel 1 in which half-cured first resin layers 2 are formed and second resin 3a is applied. As shown in FIG. 2C, second resin 3a which is sandwiched between principal plane 1a of liquid crystal panel 1 and the back surface of touch panel 4 opposed to principal plane 1a is pressed and spreads in inner area 11. Thereafter, touch panel 4 is further pressed against liquid crystal panel 1. Subsequently, second resin 3a spreads to entire inner area 11 and further flows into communication parts 13 and spreads, as shown in FIG. 2D. Thereby, second resin layer 3 is formed. In FIGS. 2C and 2D, in order to clearly show the state in which second resin 3a spreads and second resin layer 3 is formed, illustration of touch panel 4 is omitted.

Here, the air present inside inner area 11 is forced out toward communication parts 13 by second resin 3a which spreads inside inner area 11. Further, as a result of second resin 3a flowing into communication parts 13, the air present inside inner area 11 is forced out to outer area 12 through communication parts 13 by second resin 3a which flows into communication parts 13. More specifically, inclusion of air bubbles into second resin layer 3 (inner area 11) is avoided.

Further, half-cured first resin layer 2 functions as a spacer which defines a space between liquid crystal panel 1 and touch panel 4. As a result, the gap between liquid crystal panel 1 and touch panel 4 is kept constant, and the thickness of second resin 3a which spreads in inner area 11 and communication parts 13 becomes uniform. More specifically, the thickness of second resin layer 3 becomes uniform.

Furthermore, half-cured first resin layer 2 also functions as a wall which regulates the squeeze-out of second resin 3a.

More specifically, first resin layers 2 having a constant thickness are disposed in the periphery of inner area 11. Further, the back surface of touch panel 4 is superimposed on first resin layers 2 without a gap. Therefore, inner area 11 is practically a closed space, and communicates with outer area 12 only through communication parts 13. Accordingly, second resin 3a which spreads in inner area 11 does not over first resin layer 2 and is not squeezed out to outer area 12. In other words, second resin 3a spreads to the outside only through communication parts 13. Therefore, the position where second resin 3a is squeezed out and the quantity of squeeze-out can be controlled easily and reliably.

After second resin layer 3 is formed as described above, first resin layer 2 and second resin layer 3 are totally cured according to a predetermined method. Specifically, when the first resin, and second resin 3a are light-curing resins such as ultraviolet curable resins, resin layers 2 and 3 are totally cured by irradiating the resins with a light beam of a predetermined wavelength. Further, when the first resin, and second resin 3a are thermosetting resins, resin layers 2 and 3 are totally cured by being heated to a predetermined temperature. Further, when the first resin, and second resin 3a are anaerobically curable resins, resin layers 2 and 3 are totally cured by being shut off from air. Further, when the first resin, and second resin 3a are resins with different characteristics, they are totally cured respectively by suitable methods. If at least one of the first resin, and second resin 3a has adhesiveness, display panel 1 and touch panel 4 will adhere to each other by the adhesive force of the resin. More specifically, in the present invention, it is sufficient if at least one of the first resin, and second resin 3a has adhesiveness.

According to the above steps, the adhesion of touch panel 4 to liquid crystal panel 1 is completed. Touch panel 4 which is adhered to liquid crystal panel 1 as described above has its entire surface supported by first resin layer 2 and second resin layer 3, and therefore, it is obvious that touch panel 4 is not bent even if it receives pressure. Further, it is also obvious that an air layer is not interposed between liquid crystal panel 1 and touch panel 4.

Second Exemplary Embodiment

Next, another exemplary embodiment of the manufacturing method of the display device of the present invention will be described. The basic configuration of the manufacturing method according to the present exemplary embodiment is common to the manufacturing method according to the first exemplary embodiment. Therefore, only the difference between the manufacturing method according to the present exemplary embodiment and the manufacturing method according to the first exemplary embodiment will be described hereinafter, and the redundant description will be omitted.

Figure 3A:
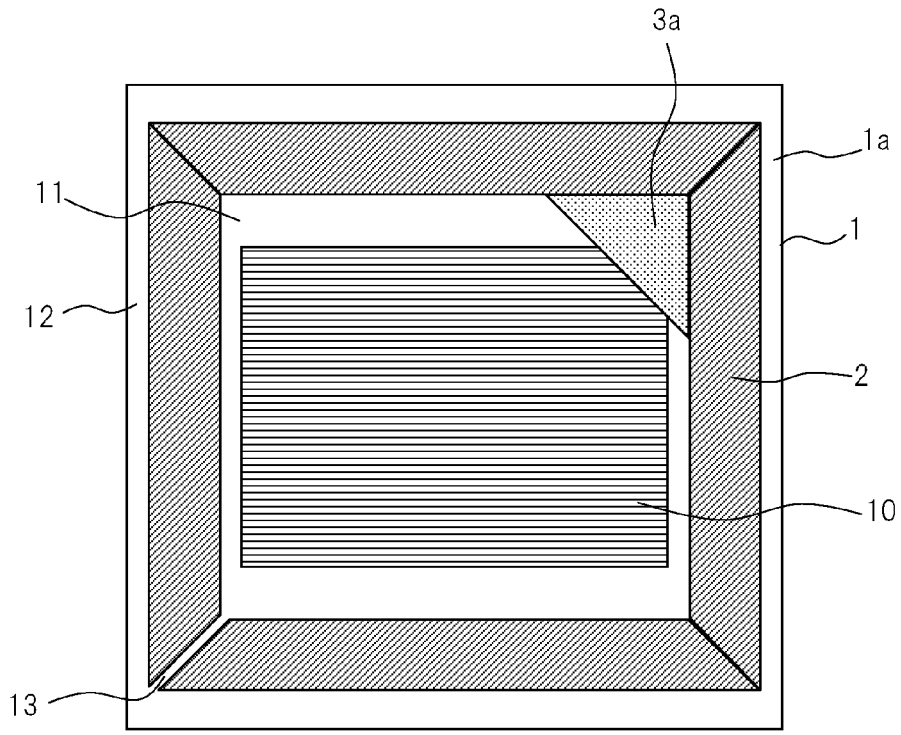
FIGS. 3A to 3C are schematic plane views showing a second exemplary embodiment of the manufacturing method of the display device of the present invention.

The manufacturing method according to the present exemplary embodiment and the manufacturing method according to the first exemplary embodiment differ concerning first resin layer 2. Specifically, in the manufacturing method according to the first exemplary embodiment, four independent first resin layers 2 are formed at the outside of display part 10 of liquid crystal panel 1. In contrast to this, in the manufacturing method according to the present exemplary embodiment, single first resin layer 2 is formed at the outside of display part 10 as shown in FIG. 3A. Further, inner area 11 surrounded by first resin layer 2 is allowed to communicate with outer area 12 through one communication part 13. In other words, one communication part 13 is formed between end portions of first resin layer 2 which are opposite to each other.

Figure 3B:
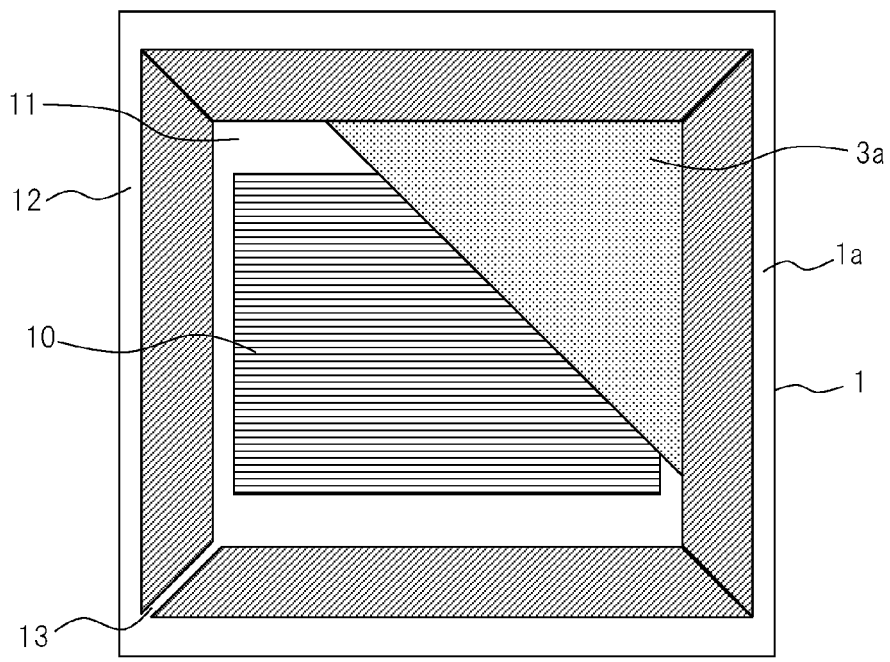
Figure 3C:
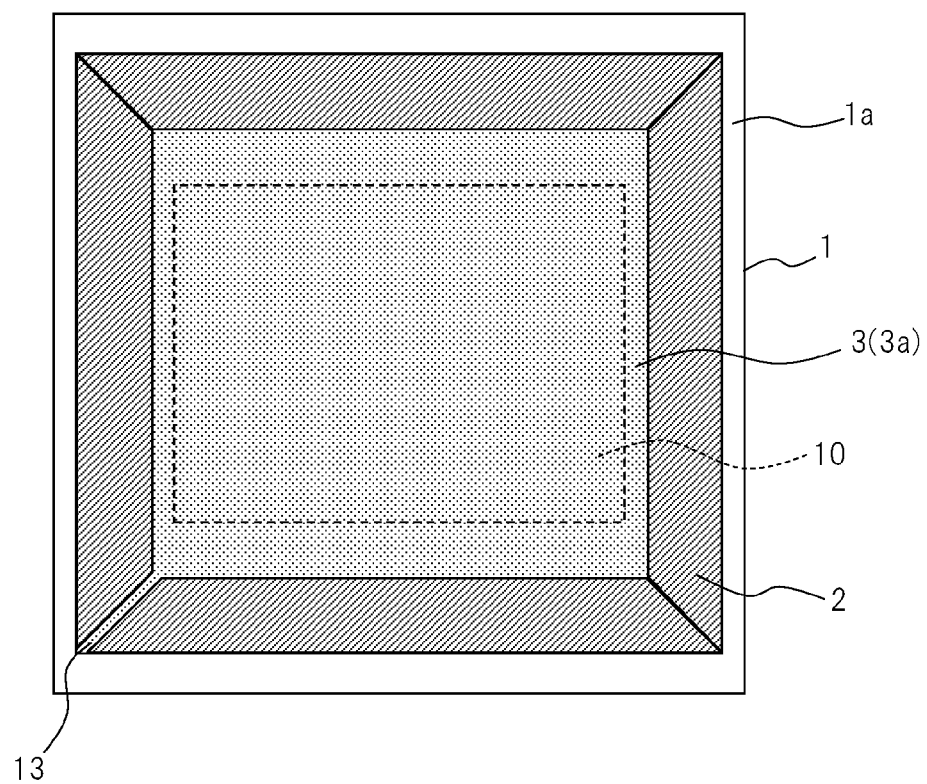

In the manufacturing method according to the present exemplary embodiment, second resin 3a is applied to a position which is in inner area 11 and is the farthest from communication part 13, as shown in FIG. 3A. Second resin 3a which is applied to such a position is sandwiched between principal plane 1a of liquid crystal panel 1 and the back surface of touch panel 4 (not illustrated), and thereby, spreads in inner area 11 as in the manufacturing method according to the first exemplary embodiment. However, in the manufacturing method according to the first exemplary embodiment, second resin 3a spreads in a radial fashion. More specifically, second resin 3a spreads from the center of inner area 11 to the four corners thereof. In contrast to this, in the manufacturing method according to the present exemplary embodiment, second resin 3a spreads toward communication part 13 from one corner of inner area 11 which is the farthest from communication part 13, as shown in FIG. 3B. However, such a difference is not an essential difference. More specifically, the air which exists in inner area 11 is forced out to communication part 13 by second resin 3a which spreads in inner area 11. Furthermore, second resin 3a finally spreads to the whole of inner area 11, and further flows into communication part 13 and spreads, as shown in FIG. 3C. As a result, the air which exists in inner area 11 is forced out to outer area 12, and second resin layer 3 is formed.

In the present description, the exemplary embodiments are described as regarding a case in which the functional film is the touch panel, as an example. However, the functional film includes all films and panels having specific functions, made of glass, plastics and the like. For example, the functional films include a parallax barrier and a display panel other than a touch panel.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A manufacturing method of a display device with a functional film that is adhered to a principal plane of a display panel provided with a display part, comprising:
    forming a first resin layer at the outside of said display part on said principal plane so as to surround said display part;
    forming a communication part which connects an inner area surrounded by said first resin layer and an outer area outside of said first resin layer into communication with each other in an in-plane direction of said principal plane;
    applying a second resin to said inner area;
    superimposing said functional film on said principal plane; and
    pressing and spreading said second resin throughout said inner area and said communication part by pressing said functional film against said principal plane.

2. The manufacturing method of the display device according to claim 1,
    wherein a plurality of said first resin layers are formed, and said communication part is formed by forming a gap between adjacent said first resin layers.

3. The manufacturing method of the display device according to claim 1,
wherein a plurality of said communication parts are formed, and said second resin is applied to a position which is inside said inner area and is equidistant from said respective communication parts.

4. The manufacturing method of the display device according to claim 1,
wherein only one communication part is formed, and said second resin is applied to a position which is inside said inner area and which is the farthest from said communication part.

5. The manufacturing method of the display device according to claim 1,
wherein said first resin layer is half-cured before said second resin is applied.

6. The manufacturing method of the display device according to claim 1,
wherein said functional film is one item from among a touch panel, a parallax barrier and a display panel, other than said display panel.

7. A display device with a functional film that is adhered to a principal plane of a display panel provided with a display part, comprising;
a first resin layer formed on said principal plane so as to surround said display part;
said functional film superimposed on said principal plane through said first resin layer;
a communication part which connects an inner area surrounded by said first resin layer and an outer area outside of said first resin layer into communication with each other in an in-plane direction of said principal plane; and
a second resin layer formed throughout said inner area and said communication part.

8. The display device according to claim 7,
wherein a plurality of said first resin layers are included, and said communication part is formed between adjacent said first resin layers.

9. The display device according to claim 7,
wherein a single first resin layer is formed, and said communication part is formed between end portions of said first resin layer which are opposite to each other.

10. The display device according to claim 7,
wherein said functional film is one item from among a touch panel, a parallax barrier and a display panel, other than said display panel.

* * * * *